United States Patent Office 3,813,438
Patented May 28, 1974

---

3,813,438
PROCESS FOR PREPARING N-SUBSTITUTED ACRYLAMIDES
Akira Oshima, Mumazu, and Kazuhiko Tsuboshima and Nobuhito Takahashi, Fuji, Japan, assignors to Kohjin Co., Ltd., Tokyo, Japan
No Drawing. Filed Apr. 11, 1972, Ser. No. 243,450
Claims priority, application Japan, Apr. 12, 1971, 46/22,355
Int. Cl. C07c 103/30
U.S. Cl. 260—561 N                16 Claims

ABSTRACT OF THE DISCLOSURE

A process for preparing N-alkyl acrylamides comprising reacting in a Diels-Alder reaction cyclopentadiene with a dienophile having the formula

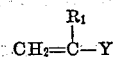

in which $R_1$ and Y are defined hereinafter, to form a Diels-Alder adduct, amidating the Diels-Alder adduct to form a N-mono- or N-di-alkylamide adduct thereof, and thermally decomposing the resulting amide adduct is disclosed.

BACKGROUND OF THE INVENTION

(1) Field of the invention

The present invention relates to a process for preparing N-alkyl substituted acrylamides. More particularly, the present invention relates to a process for preparing N-alkyl substituted acrylamides by reacting a Diels-Alder adduct of an acrylic compound with an amide forming agent and thermally decomposing the resulting amide adduct to prepare the N-substituted acrylamide.

Description of the prior art

N-alkyl substituted acrylamides represented by the formula

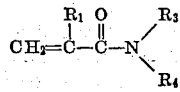

wherein $R_1$ represents a hydrogen atom or a methyl group, $R_3$ represents a hydrogen atom or an alkyl group, and $R_4$ represents an alkyl group are difficult to synthesize in good yield and at the same time to prevent an addition reaction or a polymerization reaction of the active double bond in the molecule.

The following are two processes for synthesizing the N-alkyl substittued acrylamides.

Namely, one process comprises reacting acrylic chloride with mono- or dialkylamines. This process is the most common process for preparing the above mentioned compounds. However, this process has the disadvantage that the addition reaction of the amines to the active double bond occurs in addition to the forming of the N-alkylamides, because the reaction is an exothermic one, and consequently, the yield is markedly lowered.

Therefore, it is necessary in this process to conduct the reaction slowly using a large amount of solvents and controlling the temperature carefully in a diluted solution. In addition, lachrynatory problems of acrylic chloride are maintained for a long time. Accordingly, this process is very unsuitable as an industrial process.

The other process comprises amidating compounds containing an acryl group in which the active double bond is protected by adding a hydrogen halide, acetic acid or amines, to the double bond to prepare the N-alkyl substituted amides thereof, and subsequently decomposing the resulting saturated N-alkyl substituted amides to cause a dehydrohalogenation, deacetylation or deamination and the like so as to regenerate a double bond, by which the desired N-alkyl substituted acrylamides are prepared.

However, in such decomposition reactions, a decomposition furnace having a relatively high temperature is often required. In addition, handling is troublesome and the yield is low.

As object of the present invention is to provide a process for preparing N-alkyl substituted acrylamides which does not have the above described disadvantages.

SUMMARY OF THE INVENTION

The process of the present invention comprises reacting in a Diels-Alder reaction cyclopentadiene with a dienophile represented by the formula

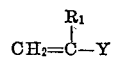

wherein $R_1$ represents a hydrogen atom or a methyl group and Y represents a —$COOR_2$ group in which $R_2$ represents a hydrogen atom or an alkyl group having from 1 to about 4 carbon atoms; a —CN group; a —CHO group; a —$CONH_2$ group; or a —COX group, in which X represents a chlorine atom or a bromine atom, to form a Diels-Alder adduct, reacting the Diels-Alder adduct with an amide forming agent to prepare the N-mono- or dialkylamide adduct thereof, and decomposing thermally the resulting amide adduct to prepare an N-alkyl substituted acrylamide of the formula

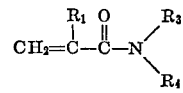

wherein $R_1$ represents a hydrogen atom or a methyl group, $R_3$ represents a hydrogen atom or an alkyl group having from 1 to about 4 carbon atoms and $R_4$ represents an alkyl group having from 1 to about 4 carbon atoms.

DETAILED DESCRIPTION OF THE INVENTION

Namely, the present process utilizes the Diels-Alder reaction in order to protect the active double bond. As the result of much research on the Diels-Alder reaction between many types of dienes and acryl group containing dienophiles and on the thermal decomposition reaction of N-alkylamide adducts prepared from the Diels-Alder adducts, it has been found that the Diels-Alder adducts are prepared in very high yield when employing cyclopentadiene as the diene and acrylic compounds such as acrylic acid, acrylic acid esters, acrolein and acrylic chloride etc. as the dienophile and that the N-alkyl substituted amides of the above mentioned adducts are thermally decomposed easily to form the desired N-alkyl substituted acrylamides and cyclopentadiene as the starting material in good yield.

According to the process of the present invention, the double bond existing in the Diels-Alder adducts is an internal olefinic bond and has very poor reactivity in comparison with the reactivity of the double bond of the acryl group existing in the dienophile prior to the Diels-Alder reaction. Accordingly, side reactions to the double bond in addition to the main reaction do not occur in carrying out the N-alkyl substitution reaction, and a wide range of reaction conditions can be utilized in the N-alkyl substitution reaction.

Further, since the thermal decomposition of the N-alkylamide Diels-Alder adducts can be conducted very easily, a complicated apparatus is not necessary in the decomposition step.

Accordingly, the process of this invention is very economical, since the yield by the thermal decomposition reaction is very high and the cyclopentadiene used as a starting material can be recovered. The N-substituted acrylamides obtained by the process of this invention include dimethyl acrylamide, diethyl acrylamide, monoethyl acrylamide. These materials are valuable commercially and can be used to produce modifiers, anti-static agents, coagulants for photographic emulsions and to produce synthetic fibers and resins.

In the present invention, suitable dienophiles which can be reacted with cyclopentadiene by the Diels-Alder reaction, are compounds having the following formula

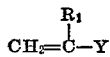

wherein $R_1$ represents a hydrogen atom or a methyl group and Y represents a —$COOR_2$ group in which $R_2$ represents a hydrogen atom or an alkyl group having from 1 to about 4 carbon atoms, a —CN group, a —CHO group, a —$CONH_2$ group or a —COX group in which X represents a chlorine atom or a bromine atom e.g., compounds having the formulas

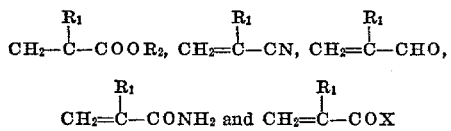

wherein $R_1$, $R_2$ and X are as described above.

Suitable specific examples of compounds having the above formulas are acrylic acid, methacrylic acid, methyl acrylate, methylmethacrylate, ethyl acrylate, ethyl methacrylate, acrylonitrile, methacrylonitrile, acrolein, methacrolein, acrylamide, methacrylamide, acrylic chloride and methacrylic chloride. Particularly, the acids and the esters represented by the formula

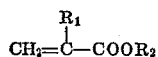

are preferred, since these compounds are inexpensive the amide formation of the Diels-Alder adducts is carried out easily. Nitriles represented by the formula

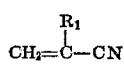

are preferably used.

The Diels-Alder addition reaction is accomplished by mixing directly both the dienophile and cyclopentadiene or mixing them at a room temperature or, if desired, with heating. Suitable molar ratios of the cyclopentadiene to the dienophile can range from about 1:05 to about 1:1.5, preferably from about 1:0.8. The reaction temperature can vary. Generally the reaction temperature can range from about 0° C. to about 150° C., preferably from about 20° C. to about 40° C. The reaction time will vary and completion of the reaction can be determined using suitable techniques, such as gas chromatography. Generally, about one hour is required.

The resulting Diels-Alder adducts formed from the cyclopentadiene and the dienophile have the following formula

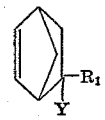

(hereinafter, the

group will be represented by "Z—") wherein $R_1$ represents a hydrogen atom or a methyl group and Y represents —$COOR_2$, —CN, —CHO, —$CONH_2$, and —COX, with both $R_1$ and Y depending on the particular type of dienophile used.

These Diels-Alder adducts are then treated with an amide forming agent to form the N-alkylamides thereof, namely, the N-alkylamide Diels-Alder adducts represented by the following formula

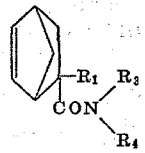

wherein $R_1$ represents a hydrogen atom or a methyl group, $R_3$ represents a hydrogen atom or an alkyl group, and $R_4$ represents an alkyl group. These N-alkylamide Diels-Alder adducts can be prepared by changing Z—Y into

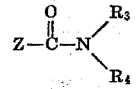

In the formation of the N-alkylamides of the Diels-Alder adducts, conventional amide forming reactions by an amide forming agent which is used generally in amidating compounds which do not contain C=C double bond can be employed. The term amide forming agent as used herein is intended to cover reaction of the Diels-Alder adduct with an agent which will convert the various Y groups hereinbefore described into a

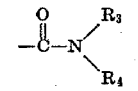

group or a combination of steps to accomplish said conversion. For example, Z—$CONR_3R_4$ can be prepared by reacting an amine such as $HNR_3R_4$ directly with acids or esters having the formula Z—$COOR_2$, with the acid halides having the formula Z—COX, and with nitriles having the formula Z—CN. Z—$CONR_3R_4$ also can be prepared by reacting the hydrochloride of amines having the formula $HNR_3R_4.HCl$ with the amides of the formula Z—$CONH_2$. Further, Z—$CONR_3R_4$ can be prepared by reacting acids of the formula Z—COOH with N—dialkyl phosphorus triamides of the formula $P(NR_3R_4)_3$ in which $R_3$ and $R_4$ are as described above. This process is preferable in the viewpoint that side reactions seldom occur and amidation is carried out selectively.

Furthermore, Z—$COR_3R_4$ can be prepared by treating acids of the formula Z—COOH with a chlorinating agent, such as $SOCl_2$, $POCl_3$, $PCl_3$ or benzoyl chloride, to produce Z—COCl and reacting this with an amine having the formula $HNR_3R_4$, or can be prepared by oxidizing aldehydes of the formula Z—CHO with an oxidizing agent, such as oxygen, $KMnO_4$ or $CrO_3$, to proudce Z—COCH and reacting this with $HNR_3R_4$. In this case, a combination of $SOCl_2$ and $HNR_3R_4$ and a combination of oxygen and $HNR_3R_4$ correspond to the amide forming agent of the present invention.

The reaction conditions under which the Z—Y Diels-Alder adduct can be converted into the

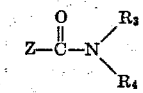

N-alkyl amide-Diels-Alder adduct will vary depending upon the type of Diels-Alder adduct, i.e., upon the particular Y group, and the completion of the reaction can be determined using conventional techniques such as gas chromatography. For example, where the adduct is Z—$COOR_2$ and the amide forming agent is $HNR_3R_4$, reaction temperature can range from about 20° C. to about 170° C., preferably from about 40° C. to about 140° C. with the molar ratio of the adduct to the amide forming agent ranging from about 1:1 to about 1:2, preferably from about 1:1.1 to about 1:1.5, and with a reaction time of about 6 hours. Where the adduct is Z—COX, the reaction temperature can range from about 0° C. to about 100° C., preferably about 5° C. to about 50° C., with the molar ratio of the addulct to the amide forming agent ranging from about 1:2 to about 1:4 preferably from about 1:2.2 to 1:3.0 and with a reaction time of about 2 hours. Where the adduct is Z—CN, the reaction temperature can range from about 50° C. to about 180° C., preferably from about 100° C. to about 170° C., with the molar ratio ranging from about 1:1.5 to about 1:3, preferably from about 1:2 to about 1:2.5 with a reaction time of about 10 hours. In the above cases where the adduct is Z—COOR$_2$, Z—COX, and Z—CN, the amide forming agent generally used is an amine of the formula HNR$_3$R$_4$ and the reaction is generally conducted in the absence of a solvent. However, where the adduct is Z—COX an aromatic hydrocarbon solvent, such as benzene, toluene and the like generally is used.

Where the adduct is Z—CONH$_2$ the reaction temperature can range from about 100° C. to about 180° C., preferably from about 150° C. to about 170° C., with the molar raio of the adduct to the amide forming agent ranging from about 1:1 to 1:2, preferably from about 1:1.1 to 1:1.5 and with a reaction time generally of about 3 hours.

Where the adduct is Z—COHO, and where P(NR$_3$R$_4$)$_3$ is used as the amide forming agent, suitable reaction temperatures are from about 50° C. to about 150° C., preferably from about 100° C. to 120° C., with the molar ratio of the adduct to the amide forming agent ranging from about 1:1 to about 1:2, preferably from about 1:1.1 to about 1:1.5 and with the reaction time being generally about 1 hour.

Suitably the groups R$_3$ and R$_4$ in the above described amide forming agents can be alkyl groups having from 1 to about 4 carbon atoms preferably from 1 to about 2 carbon atoms.

These amide adducts thermally decompose into cyclopentadiene and the desired N-substituted acrylamide easily is obtained by simply heating the amide adducts to a temperature of above about 120° C. Generally the temperature at which the decomposition can be conducted can be any temperature above about 120° C. to the point of the decomposition of the N-alkyl substituted acrylamide. Usually a temperature of from about 120° C. to about 500° C., preferably from about 150° C. to about 350° C. can be suitably employed.

Accordingly, the N-substituted acrylamide desired can be obtained by heating the obtained amide adduct and separating the resulting N-substituted acrylamide and cyclopentadiene using the differences in their boiling points. It is of course possible to utilize the recovered cyclopentadiene for the Diels-Alder reaction again.

In the following, the present invention will be explained in greater detail by reference to the following examples.

EXAMPLE 1

165 g. of cyclopentadiene was added dropwise to 180 g. of arcylic acid with stirring and keeping the reactants at room temperature. After the addition, the reaction was continued for an hour. Then the reaction product was distilled under a reduced pressure to prepare 387 g. of 5-bicyclo[2.2.1]heptene-2-carboxylic acid (B.P. 130–131° C./15 mm. Hg). After adding 360 g. of thionyl chloride to 276 g. of the above mentioned adduct, the reaction was continued at 150° C. for an hour. Thus 200 g. of acid chloride of the above mentioned adduct (B.P. 76–78° C./11–12 mm. Hg) was obtained on distillation under a reduced pressure. After dissolving 156 g. (1 mol) of the resulting acid chloride in 500 ml. of benzene, 100 g. of dimethylamine gas was introduced thereto to react. After the reaction was completed the crystals were filtered and the benzene was removed by distillation, by which 140 g. of 5-bicyclo[2.2.1]heptene-2-N,N-dimethyl carboxamide (B.P. 140–141° C./15 mm. Hg) was prepared. 100 g. of the resulting amide adduct was then passed through a Raschig ring containing decomposition tower made of hard glass and heated to 250° C., by which 55 g. (92%) of N,N-dimethylacrylamide and 38 g. (95%) of cyclopentadiene were obtained.

EXAMPLE 2

400 g. of 5-bicyclo[2.2.1]heptene-2-carboxylic acid prepared in the same manner as described in Example 1 was heated to 100–110° C., and 220 g. of hexamethyl phosphorus triamide, P[N(CH$_3$)$_2$]$_3$, was added dropwise thereto with stirring. After the addition, the reaction was continued for an hour. After the reaction was completed 422 g. (88%) of 5-bicyclo[2.2.1]heptene-2-N,N-dimethylcarboxamide (B.P. 135–142° C./15 mm. Hg) was obtained by distillation under a reduced pressure. Then 100 g. of the resulting amide adduct was subjected to thermal decomposition in the same manner as described in Example 1, by which 56 g. (93%) of N,N-dimethylacrylamide and 38 g. (95%) of cyclopentadiene were obtained.

EXAMPLE 3

200 g. of cyclopentadiene was added dropwise to 260 g. of methyl acrylate with stirring and keeping the reactants at room temperature. After the addition, the reaction was continued for an hour. The reaction mixture was then distilled under a reduced pressure to prepare 414 g. of 5-bicyclo[2.2.1]heptene-2-carboxylic acid methyl ester (B.P. 79–81° C./15 mm. Hg). After adding 34 g. of dimethylamine to 76 g. of the above mentioned adduct, the mixture was subjected to reaction at 140° C. for 6 hours in an autoclave. The recaction mixture was then distilled under a reduced pressure to prepare 28 g. of 5-bicyclo[2.2.1]heptene-2-N,N-dimethylcarboxylic acid amide (B.P. 129–138° C./15 mm. Hg).

By thermally decomposing 20 g. of this amide adduct in the same manner as described in Example 1, 9.8 g. (85%) of N,N-dimethylacrylamide and 7.2 g. (90%) of cyclopentadiene were obtained.

EXAMPLE 4

66 g. of cyclopentadiene was added to 105 g. of methacrylic chloride with stirring and keeping the reactants at room temperature. After the addition, the reaction was continued for an hour. The reaction mixture was then distilled under a reduced pressure to prepare 153 g. of 5-bicyclo[2.2.1]heptene - 2-methyl-2-carboxylic chloride (B.P. 81–84° C./15 mm. Hg).

To 100 g. of this adduct, 200 ml. of benzene was added and 45 g. of diethylamine was added dropwise thereto to react. The reaction mixture was then distilled under a reduced pressure to prepare 97 g. (80%) of 5-bicyclo[2.2.1]heptene - 2-methyl-2-N,N-diethyl carboxamide (150–158° C./15 mm. Hg). By thermally decomposing 82 g. of this amide adduct in the same manner as described in Example 1, 49 g. (87%) of N,N-diethyl methacrylamide and 24 g. (91%) of cyclopentadiene were obtained.

EXAMPLE 5

66 g. of cyclopentadiene was added dropwise to 53 g. of acrylonitrile with stirring and keeping the reactants at room temperature. After the addition, the reaction was continued for 3 hours. After the reaction was completed the reaction mixture was distilled under a reduced pressure, by which 110 g. (86%) of 5-bicyclo[2.2.1]-heptene-2-carboxylic acid nitrile (B.P. 75–85° C./12 mm. Hg) was obtained. 40 g. of this adduct, 30 g. of dimethylamine, 6 g. of water and 0.5 g. of zinc chloride were charged into an agitation type autoclave and subjected to reacting at 165° C. for 10 hours. The reaction mixture was then distilled under a reduced pressure, by which 24 g. (44%) of 5-bicyclo[2.2.1]heptene-2-N,N-dimethyl carboxamide (B.P. 135–142° C./15 mm. Hg) was obtained. By thermally decomposing 20 g. of the resulting amide adduct, 11 g. (92%) of N,N-dimethylacrylamide and 7.4 g. (93%) of cyclopentadiene were obtained.

EXAMPLE 6

137 g. of acrylamide was dissolved in 200 ml. of methanol. To this solution, 66 g. of cyclopentadiene was added dropwise with stirring and keeping the reactants at room temperature. After continuation of the reaction for 3 hours, methanol was removed by distillation and the residue was recrystallized from benzene, by which 111 g. (81%) of 5-bicyclo[2.2.1]heptene-2-carboxamide was obtained. To 68 g. of this adduct 31 g. of monomethylamine hydrochloride was added and the mixture was heated to 170° C. for 3 hours. After the reaction was completed, the reaction mixture was distilled under a reduced pressure to prepare 53 g. (70%) of 5-bicyclo[2.2.1]heptene - 2-N-monomethyl carboxamide (B.P. 170–177° C./15 mm. Hg). By thermally decomposing 50 g. of this amide adduct in the same manner as described in Example 1, 25 g. (89%) of N-methylacrylamide and 20 g. (91%) of cyclopentadiene were obtained.

EXAMPLE 7

132 g. of cyclopentadiene was added dropwise to 112 g. of acrolein with stirring and keeping the reactants at room temperature. After the addition, the reaction was continued for an hour. The reaction mixture was then distilled under a reduced pressure, by which 218 g. of 5-bicyclo[2.2.1]heptene-2-carboxaldehyde (B.P. 73–74° C./19 mm. Hg) was obtained. 1 g. of manganese acetate was added to 100 g. of the resulting adduct, and air at 100° C. was introduced thereto along with stirring for 10 hours. After the reaction was completed, the reaction mixture was distilled under a reduced pressure, by which 93 g. of 5-bicyclo[2.2.1]heptene-2-carboxylic acid (B.P. 130–134° C./15 mm. Hg) was obtained. 90 g. of the resulting oxide was treated with hexaethyl phosphorus triamide, $P[N(C_2H_5)_2]_3$, in the same manner as described in Example 2 to prepare 108 g. of 5-bicyclo-[2.2.1]heptene-2-N,N-diethyl carboxamide. By thermally decomposing 100 g. of this amide adduct in the same manner as described in Example 4, 59 g. (89%) of N,N-diethylacrylamide and 32 g. (84%) of cyclopentadiene were obtained.

What is claimed is:

1. A process for preparing N-alkyl substituted acrylamides having the formula

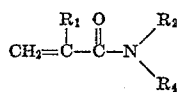

wherein $R_1$ represents a hydrogen atom or a methyl group, $R_3$ represents a hydrogen atom or an alkyl group having from 1 to about 4 carbon atoms, and $R_4$ represents an alkyl group having from 1 to about 4 carbon atoms which comprises:

(1) reacting in a Diels-Alder reaction cyclopentadiene with a dienophile selected from the group of compounds having the formula

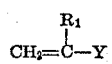

wherein $R_1$ is as described above, and Y represents a —$COOR_2$ group, in which $R_2$ represents a hydrogen atom or an alkyl group having from 1 to about 4 carbon atoms; a —CN group; a —$CONH_2$ group; a CHO group or a —COX group, in which X represents a chlorine atom or a bromine atom to form a Diels-Alder adduct having the general formula

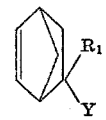

wherein $R_1$ and Y are as above described, (2) reacting said Diels-Alder adduct with an amide forming agent of the type generally used in amidating compounds which do not contain a C=C double bond to form a N-alkyl amide-Diels-Alder adduct having the general formula

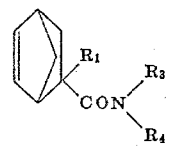

wherein $R_3$ and $R_4$ are as above described, and (3) heating to a temperature sufficiently high to decompose said N-alkyl amide-Diels-Alder adduct into cyclopentadiene and said N-substituted acrylamides.

2. The process as set forth in claim 1, wherein said dienophile is acrylic acid, methacrylic acid, methyl acrylate, methyl methacrylate, ethylacrylate, ethyl methacrylate, acrylonitrile, methacrylonitrile, acrolein, methacrolein, acrylamide, methacrylamide, acrylic chloride or methacrylic chloride.

3. The process as set forth in claim 1, wherein said Y is a —$COOR_2$ group.

4. The process as set forth in claim 1, wherein said Y is a —COOH group and said $R_1$ is a hydrogen atom.

5. The process as set forth in claim 1, wherein said Y is a —$COOCH_3$ group and said $R_1$ is a methyl group.

6. The process as set forth in claim 1, wherein where Y is a —$COOR_2$ group, a —COX group or a —CN group, said amidation is by reaction with an amine having the formula $HNR_3R_4$; where Y is a —$CONH_2$ group, said amidation is by reaction with an amine hydrohalide having the formula $HNR_3R_4.HX$; where Y is a —COOH group, said amidation is by reaction with a phosphorus amide having the formula $P(NR_3R_4)_3$ or by reaction with a chlorinating agent to form the acid chloride thereof and subsequently reacting said acid chloride with an amine having the formula $HNR_3R_4$; or where Y is a —CHO group, said amidation is by reaction with mild oxidizing agent to form the carboxylic acid thereof and subsequently reacting said carboxylic acid with an amine having the formula $HNR_3R_4$, in which $R_2$, $R_3$, $R_4$, X, are as defined in claim 1.

7. The process as set forth in claim 4, wherein said amidation is with a phosphorus amide having the formula $P(NR_3R_4)_3$, wherein $R_3$ is a hydrogen atom or an alkyl group having from 1 to about 4 carbon atoms and $R_4$ is an alkyl group having from 1 to about 4 carbon atoms.

8. The process as set forth in claim 7, wherein said phosphorus amide is $P(N(CH_3)_2)_3$.

9. The process as set forth in claim 5, wherein said amidation is with dimethylamine.

10. A process for preparing N-alkyl substituted acrylamides having the formula

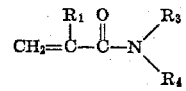

wherein $R_1$ represents a hydrogen atom or a methyl group, $R_3$ represents a hydrogen atom or an alkyl group having from 1 to about 4 carbon atoms, and $R_4$ represents an alkyl group having from 1 to about 4 carbon atoms which comprises:

(1) reacting in a Diels-Alder reaction cyclopentadiene with a dienophile selected from the group of compounds having the formula

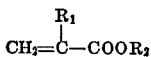

wherein $R_1$ is as described above, and $R_2$ represents a hydrogen atom or an alkyl group having from 1 to about 4 carbon atoms to form a Diels-Alder adduct having the general formula

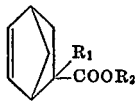

wherein $R_1$ and $R_2$ are as described above.

(2) reacting said Diels-Alder adduct directly with an amide forming agent of the type generally used in amidating compounds which do not contain a C=C bond to form a N-alkylamide-Diels-Alder adduct having the general formula

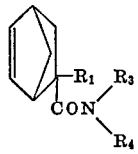

wherein $R_3$ and $R_4$ are as described above, and (3) heating to a temperature sufficiently high to decomprise said N-alkylamide-Diels-Alder adduct into cyclopentadiene and said N-substituted acrylamides.

11. The process as set forth in claim 10, wherein said $R_1$ and $R_2$ each is a hydrogen atom.

12. The process as set forth in claim 10, wherein said $R_1$ is a hydrogen atom and said $R_2$ is a methyl group.

13. The process as set forth in claim 10, wherein said amide forming agent is an amine having the formula $HNR_3R_4$, in which $R_3$ and $R_4$ are as defined in claim 10.

14. The process in claim 11, wherein said amide forming agent is a phosphorous amide having the formula $P(NR_3R_4)_3$, in which $R_3$ and $R_4$ are as defined in claim 10.

15. The process in claim 12, wherein said amide forming agent is dimethylamine.

16. The process in claim 14, wherein said amide forming agent is $P(N(CH_3)_2)_3$.

References Cited

UNITED STATES PATENTS

| | | | |
|---|---|---|---|
| 2,872,483 | 2/1959 | Bloch | 260—557 |
| 2,508,860 | 5/1950 | Grimmel et al. | 260—561 R |
| 2,510,491 | 6/1950 | Ardis | 260—557 R |
| 2,541,930 | 2/1951 | Martin et al. | 260—561 N |
| 2,245,129 | 6/1941 | Greenwalt | 260—561 R |

OTHER REFERENCES

CA: 65, 12122g, Inukai et al., 1966.
CA: 63, 13025f, Arbuzov et al., 1965.
CA: 75, 129307h, Castro et al., 1971.
CA: 71, 13071g, Burgada et al., 1969.
Royals, Advanced Org. Chem., copyright 1954, reprint 1956, Prentice-Hall, p. 409 pertinent.

ELBERT L. ROBERTS, Primary Examiner

E. G. LOVE, Assistant Examiner

U.S. Cl. X.R.

260—464, 468 B, 514 B, 544 L, 557 R, 598